United States Patent [19]

Cuscurida et al.

[11] Patent Number: 4,539,378
[45] Date of Patent: Sep. 3, 1985

[54] VINYL POLYMER POLYOLS MADE USING EPOXY RESIN-MODIFIED POLYOLS

[75] Inventors: Michael Cuscurida; Ernest L. Yeakey, both of Austin, Tex.

[73] Assignee: Texaco Inc., White Plains, N.Y.

[21] Appl. No.: 654,903

[22] Filed: Sep. 27, 1984

[51] Int. Cl.³ .................. C08G 65/32; C08G 18/14; C08G 18/67; C08L 71/02
[52] U.S. Cl. .................. 525/407; 521/137; 521/174; 521/177; 521/914; 525/404; 525/507; 528/75; 528/418
[58] Field of Search .............. 521/137, 174, 914, 177; 252/182; 525/507, 407, 404; 528/418, 75

[56] References Cited

U.S. PATENT DOCUMENTS

| | | | |
|---|---|---|---|
| 3,008,917 | 11/1961 | Park et al. | 528/83 |
| 3,304,273 | 2/1967 | Stamberger | 260/2.5 |
| 3,325,421 | 6/1967 | Mueller | 528/68 |
| 4,104,236 | 8/1978 | Simroth | 521/137 |
| 4,125,505 | 11/1978 | Critchfield et al. | 260/33.2 R |
| 4,148,840 | 4/1979 | Shah | 260/859 R |
| 4,214,055 | 7/1980 | Seefried et al. | 521/137 |
| 4,226,756 | 10/1980 | Critchfield et al. | 526/209 |
| 4,242,249 | 12/1980 | Van Cleve et al. | 521/137 |
| 4,316,991 | 2/1982 | Speranza et al. | 521/174 |
| 4,323,658 | 4/1982 | Speranza et al. | 521/174 |
| 4,338,408 | 7/1982 | Zimmerman et al. | 521/115 |
| 4,342,687 | 8/1982 | Zimmerman et al. | 260/330.6 |
| 4,373,034 | 2/1983 | Speranza et al. | 521/177 |
| 4,381,353 | 4/1983 | McDaniel | 521/163 |

*Primary Examiner*—Herbert S. Cockeram
*Attorney, Agent, or Firm*—Jack H. Park; Kenneth R. Priem; Richard A. Morgan

[57] ABSTRACT

Vinyl polymer polyols made by polymerizing in situ via a free-radical mechanism one or more vinyl monomers in an epoxy resin-modified polyol are described. Preferably, styrene and acrylonitrile are copolymerized in a polyol made by adding epoxy resin to the alkoxylation of a polyol initiator having 3 to 4 hydroxyl groups. The vinyl polymer polyols of this invention give flexible polyurethane foams with greater load-bearing properties.

14 Claims, No Drawings

VINYL POLYMER POLYOLS MADE USING EPOXY RESIN-MODIFIED POLYOLS

CROSS REFERENCE TO RELATED APPLICATION

This application is related to U.S. patent application Ser. No. 06/654,904, filed of even date, which is concerned with improved polyurethane foams made using the vinyl polymer polyols of the instant invention.

BACKGROUND OF THE INVENTION

1. Field of the Invention

This invention relates to polymer dispersions in polyols and more particularly relates to dispersions of polymers made from various vinyl monomers in the presence of polyols as the dispersing media.

2. Related Art in the Field

The use of a polyol in the preparation of polyurethanes by reaction of the polyol with a polyisocyanate in the presence of a catalyst and perhaps other ingredients is well known. Conventional polyols for flexible polyurethane foams are usually made by the reaction of a polyhydric alcohol with an alkyene oxide, usually ethylene oxide and/or propylene oxide, to a molecular weight of about 2,000 to 3,000 and above. These polyols are then reacted with polyisocyanate in the presence of water or other blowing agents such as fluorocarbons to obtain polyurethane foams. Polyols have been modified in many ways in attempts to improve the properties of the resulting polyurethane.

One common method of modifying polyols involves the use of polymers as the dispersed phase. One type is made by polymerizing vinyl monomers such as acrylonitrile and styrene in polyols. Another type includes the polymerization of vinyl monomers in polyol-isocyanate addition products. Another type involves the preparation of polyurea polymers by the reaction of diamines with diisocyanates in a polyol.

For example, U.S. Pat. No. 3,008,917 to Park, et al. teaches adding an unsaturated liquid monomer such as styrene to a polyester-isocyanate adduct which itself contains vinyl unsaturation. The resulting mixture is then copolymerized through the unsaturated linkages. U.S. Pat. No. 3,304,273 to Stamberger discloses a polymer polyol made by mixing a minor amount of a film-forming polymer having radicals reactive with the —N=C=O radicals of an organic polyisocyanate (such as polymers of acrylic acid, allyl alcohol, styrene, butadiene, etc.) in with a major amount of a solvent which also contains radicals reactive with an isocyanate group but has little or no ethylenic unsaturation (such as a polyol). Similar polymer polyols where the dispersed polymers consist of polymerized unsaturated monomers such as methacrylonitrile, styrene, etc., particularly copolymers using more than one kind of unsaturated monomer are disclosed in U.S. Pat. No. 3,383,351 to Stamberger. These materials are useful in preparation of polyurethane products.

U.S. Pat. No. 4,104,236 to Simroth reveals a liquid polymer polyol composition containing 45–90 wt. % of a polyoxypropylene polyol having a molecular weight of at least 1500 and 55 to 10 wt. % of a polymer. The polymer consists of 60 to 90 wt. % polymerized acrylonitrile and 40 to 10 wt. % of polymerized styrene. Polyurethane foams having high load-bearing properties and solid polyurethane elastomers having a high modulus were made from these materials. A polymer polyol consisting of 45 to 95 wt. % of a poly(oxypropyleneoxyethylene) polyol having a hydroxyl number of 20 to 60, an oxyethylene cap of 10 to 30 wt. % and an internal oxyethylene content of 5 to 60 wt. % and from 5 to 60 wt. % of a polymerized vinyl monomer (such as a copolymer of styrene and acrylonitrile) is taught in U.S. Pat. No. 4,125,505 to Critchfield, et al. Further, U.S. Pat. No. 4,148,840 to Shah, et al. discloses polymer polyol compositions made by polymerizing one or more ethylenically unsaturated monomers in a polyol.

High resilience urethane foams may be prepared from tolylene diisocyanate and novel polymer polyol compositions made with acrylonitrile and vinylidene chloride monomers according to U.S. Pat. No. 4,214,055 to Seefried, et al. The acrylonitrile-vinylidene chloride polymer polyol compositions apparently enhance the load-bearing properties and decrease the flammability of the resultant foams. U.S. Pat. No. 4,226,756 to Critchfield, et al. teaches that polyol/vinyl polymer blends made by polymerizing acrylonitrile, styrene and/or methyl methacrylate in the presence of polyethylene-polypropylene glycols are useful in producing polyurethanes. Polymer stabilizers made by polymerizing 30:70 acrylonitrile-styrene mixtures with polypropylene glycol mono-butyl ether methacrylate are disclosed by U.S. Pat. No. 4,242,249 to Van Cleve, et al. as useful stabilizers for polyol-vinyl monomer reaction products.

U.S. Pat. No. 3,325,421 to Miller, et al. describes polyurea polymer polyols made by reaction of diamines with diisocyanate using a polyol as the dispersing media. See also British Pat. No. 899,413, which discloses the emulsion polymerization of vinyl monomers in a suspending agent where the agent is made by condensing polyethylene glycol with the diglycidyl ether of bisphenol A.

The polyols found to be useful as the dispersing media in this invention are polyols modified with epoxy resins. Generally, a polyepoxide is added into the reaction of a polyol initiator with mixtures of alkylene oxides before the alkylene oxide addition is complete. For example, see U.S. Pat. Nos. 4,316,991 and 4,373,034 both to Speranza, et al., incorporated by reference herein.

SUMMARY OF THE INVENTION

The invention concerns a vinyl polymer polyol prepared by polymerizing via a free-radical reaction a vinyl monomer component having at least one vinyl monomer in the presence of an epoxy-resin modified polyol having a molecular weight of 2,000 to 7,000.

DETAILED DESCRIPTION OF THE PREFERRED EMBODIMENTS

Polymer polyols are typically prepared by the free-radical catalyzed polymerization of vinyl monomers by using various polyols as the dispersing media. These polymer polyols have been used to enhance the load-bearing properties of molded high resilience foam used in automotive seating and slab flexible foam used in carpet underlay.

It has been discovered that the preparation of vinyl polymer polyols by the free radical-initiated polymerization of vinyl monomers in epoxy resin-modified polyols as the reaction media gives polymer polyols which are more effective than conventional polymer polyols in increasing the load-bearing properties of flexible foams. In addition, firmer polyurethane foams using polymer polyols with lower polymer loadings can be produced using the polymer polyols of the invention.

The Reactants

The monomers useful in the process of this invention are the polymerizable monomers characterized by the presence therein of at least one polymerizable ethylenic unsaturated group of the type C=C. The monomers can be used singly or in combination to produce homopolymer/reactive solvent products or copolymer/reactive solvent combinations, respectively.

Preferably, the monomers contain the double bond in a vinyl group. These monomers are well known in the art and include the hydrocarbon monomers such as styrene, butadiene, isoprene, 1,4-pentadiene, 1,6-hexadiene, 1,7-octadiene, α-methylstyrene, methyl styrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethyl styrene, iodostyrene, cyanostyrene, nitrostyrene, N,N-dimethylaminostyrene, actoxystyrene, methyl 4-vinylbenzoate, phenoxystyrene p-vinyldiphenyl sulfide, p-vinylphenyl oxide, and the like. Also suitable are acrylic and substituted acrylic monomers such as acrylic acid, methacrylic acid, acrylonitrile, methyl methacrylate methylacrylate, 2-hydroxyethyl acrylate, 2-hydroxyethyl methacrylate, cyclohexylmethacrylate, benzyl methacrylate, isopropyl methacrylate, octyl methacrylate, methacrylonitrile, methyl alpha-chloroacrylate, ethyl alpha-ethoxyacrylate, methyl alpha-acetaminoacrylate, butyl acrylate, 2-ethylhexyl acrylate, phenyl acrylate, phenyl methacrylate, α-chloroacrylonitrile, N,N-dimethylacrylamide, N,N-dibenzylacrylamide, N-butylacrylamide, methacrylyl formamide, and the like. The vinyl esters, vinyl ethers, vinyl ketones, etc. are also useful, such as vinyl acetate, vinyl chloroacetate, vinyl alcohol, vinyl butyrate, isopropenyl acetate, vinyl formate, vinyl acrylate, vinyl methacrylate, vinyl methoxy acetate, vinyl benzoate, vinyl iodide, vinyl toluene, vinyl naphthalene, vinyl bromide, vinyl fluoride, vinyldiene bromide, 1-chloro-1-fluoroethylene, vinyldiene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran,2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyacetamide, N-vinylpyrrolidone, vinyl imidazole, divinyl sulfide, divinyl sulfone, sodium vinyl sulfoxide, methyl vinyl sulfonate, N-vinyl pyrrole and the like. Other compounds expected to be useful are dimethyl fumarate, dimethyl maleate, maleic acid, crotonic acid, furmaric acid, itaconic acid, monomethyl itaconate, t-butyl aminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention.

Vinyl monomers are preferred, and styrene, acrylonitrile, methyl methacrylate, methyl acrylate and butadiene are particularly preferred. It is especially preferred that styrene and acrylonitrile be used together. The preferred mole ratio of styrene to acrylonitrile ranges from 9:1 to 1:9. Any of the known chain transfer agents can be present, if desired.

Polymerizing the monomers in the epoxy resin-modified polyol solvent occurs in the presence of a catalytically effective amount, preferably 0.5 to 5.0 wt. % based on total feed, of a conventional free radical catalyst known to be suitable for the polymerization of ethylenically unsaturated monomers. Preferred catalysts are the azo-bis compounds such as alpha, alpha'-azo-2-methyl butyronitrile, alpha, alpha'-2-methyl heptonitrile, 1,1'-azo-isobutyrate, 4,4'-azo-4-cyanopentanoic acid, azobisisobutyronitrile and the like. Other preferred catalysts are organic peroxides, peroxydicarbonates and peroxyesters. Ilustrative catalysts are the well-known free radical type of vinyl polymerization catalysts, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-alpha-cumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis(p-methoxybenzoyl) peroxide, p-monomethoxybenzoyl peroxide, rubrene peroxide, ascaridole, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, alpha-methylbenzyl hydroperoxide, alpha-methyl-alpha-ethyl benzyl hydroperoxide, tetralin hydroperoxide, triphenylmethyl hydroperoxide, diphenylmethyl hydroperoxide, persuccinic acid, diisopropyl peroxy dicarbonate, and the like. A mixture of catalysts may also be used.

Especially preferred are polymerization catalysts manufactured by the E. I. duPont de Nemous and Co. such as 2,2'-azobis(2,4-dimethylpentanenitrile), 2,2'-azobis(2-methylpropanenitrile), 2,2'-azobis(2-methylbutanenitrile), and 1,1'-azobis(cyanocyclohexane). These products are commercially sold as VAZO ® 52, 64, 67 and 88, respectively.

The polymerization must occur in an epoxy resin-modified polyol as the dispersing media. Preferably, these modified polyols are made by the reaction of a polyol initiator having an active hydrogen functionality of 3 to 8 with one or more alkylene oxides and an epoxy resin in such a manner that the epoxy resin is added internally along the length of the polyol chain. This result may be obtained, for instance, with a three-step procedure: (1) reacting a polyol initiator with an alkylene oxide, (2) reacting the alkoxylated initiator with an epoxy resin, and (3) reacting the product from step 2 with additional alkylene oxide. The final polyol preferably has a molecular weight in the range of about 2,000 to 7,000.

Suitable polyol initiators include, for example, glycerine, trimethylolpropane, 1,2,6-hexanetriol, pentaerythritol, triethanolamine, ethylenediamine, aminoethylpiperazine, sorbitol, and sucrose, or mixtures thereof. These are only mentioned for purposes of illustration. It is even expected that dihydric initiators may prove to be useful as polyol initiators in this role. For example, ethylene glycol, propylene glycol, diethylene glycol, dipropylene glycol and other diols are expected to be useful under the proper conditions. The alkylene oxides useful in making the modified polyols of this invention are preferably ethylene oxide, propylene oxide and 1,2-butylene oxide. Ethylene oxide and propylene oxide are preferred. More than one oxide may be added to the modified polyol intermediates as deemed necessary by one skilled in the art. The reactions involving the opening of various terminal epoxide groups are catalyzed usually with a basic compound. For instance, common alkaline catalysts normally employed are sodium hydroxide and potassium hydroxide.

It is anticipated that a wide variety of epoxy resins would be useful in making the epoxy resin-modified polyols suitable for the inventive polymer polyols. The vicinal polyepoxide-containing compounds are organic materials having an average of at least 1.8 reactive 1,2-epoxy groups per molecule. The polyepoxide materials can be monomeric or polymeric, saturated or unsaturated, aliphatic, cycloaliphatic, aromatic or heterocyclic and may be substituted, if desired, with other substituents besides epoxy groups, e.g., hydroxyl groups, ether radicals, aromatic groups, halogen atoms or the like. Preferably, the epoxy resin is the diglycidyl ether of bisphenol A. The epoxy resin-modified polyols of this invention may be made at conditions of temperature and pressure selected to give a polyol having certain characteristics. Typical conditions are a pressure of around 50 psig and a temperature of about 50° to 150° C. The amount of epoxy resin to be added to the reaction mixture should be such that the epoxy equivalents present are less than half of the hydroxyl functionality equivalents present in the reaction mixture. Too many epoxy equivalents in relation to the hydroxyl equivalents may cause the epoxy resin to gel by crosslinking with itself. Other details about the preparation of the epoxy resin-modified polyols useful in this invention may be found in U.S. Pat. No. 4,316,991 which is incorporated herein by reference.

The Reaction Conditions

To obtain the vinyl polymer polyols of this invention, the epoxy resin-modified polyol is preferably added first to the reaction vessel. It is usually best that the polyol be heated to the reaction temperature before the next step, which is the slow or dropwise addition of a mixture of the vinyl monomer component (which may be more than one kind of vinyl monomer) and the free radical initiator. After the reaction proceeds for a short time (0.25 to 1.0 hour), volatiles are stripped off by conventional techniques to leave the vinyl polymer polyol product.

The reaction temperature should be about 75° to 150° C., preferably 90° to 140° C. Reaction pressures may range from atmospheric pressure to about 100 psig. When mixed vinyl monomers are used, such as styrene and acrylonitrile, the mole ratios should range from about 9:1 to 1:9 or preferably 30:70 to 70:30. The amount of polymer in the polyol, also known as "polymer loading" may range from 5 to about 50 wt. %, preferably from about 10 to 40 wt. %. The vinyl polymer polyols of this invention surprisingly give improved polyurethane foams with improved load-bearing properties even at relatively low polymer loadings.

The preparation of the vinyl polymer polyols will be further illustrated by the following examples, which are not intended to limit the invention. The use of the vinyl polymer polyols of this invention in flexible polyurethane foams will also be demonstrated. The advantages over foams made from conventional polyols, conventional epoxy resin-modified polyols and conventional polymer polyols will also be shown.

EXAMPLE 1

Four hundred grams of a 5,000 m.w. epoxy resin-modified glycerine-based triol were changed into a one-liter three-necked flask equipped with a stirrer, thermometer, dropping funnel, water condenser, and nitrogen source. The polyol was prepared as described in U.S. Pat. No. 4,316,991. It had a hydroxyl number of 33.6 mg KOH/g, contained 0.5 wt. % combined diglycidyl ether of bisphenol A (DGEBPA), and had been capped with 12 wt. % ethylene oxide (EO) to contain 76% primary hydroxyl groups.

Maintaining a nitrogen purge, the polyol was heated to 130° C. A mixture of 60 g acrylonitrile, 40 g styrene and 5 g 2,2'-azobis(2-methylbutyronitrile)* was added dropwise over a 40-minute period, maintaining the reaction temperature at 128°–130° C. The reaction mixture was then digested 15 minutes and vacuum stripped to 5 mm Hg. The recovered volatiles (5.6 g) correspond to a monomer conversion of 94.4%. The finished product was an off-white viscous dispersion which had the following properties:

*VAZO 67 made by E. I. duPont de Nemours and Co.

Acid no., mg KOH/g—0.013
Hydroxyl no., mg KOH/g—27.8
Water, wt. %—0.02
Viscosity, 77° F., cps—2592
Appearance—Homogeneous dispersion

EXAMPLES 2 and 3

These examples will illustrate the preparation of polymer polyols using a 3,500 m.w. epoxy resin-modified polyol as the dispersing media. This polyol is marketed by Texaco Chemical Co. as THANOL® F-3550 polyol, which is made according to the U.S. Pat. No. 4,316,991 procedures. The general procedure of Example 1 was used in these experiments. Reaction changes, details of preparation and properties are as follows:

| Example | 2 | 3 |
| --- | --- | --- |
| Charge | | |
| THANOL® F-3550, g | 900 | 800 |
| Styrene, g | 40 | 80 |
| Acrylonitrile, g | 60 | 120 |
| VAZO 67, g | 10 | 10 |
| Reaction Details | | |
| Temperature, °C. | 130–134 | 128–132 |
| Monomer addition time, hr. | 0.7 | 1.1 |
| Digestion time, hr. | 0.25 | 0.25 |
| Monomer conversion, % | 87.5 | 94.6 |
| Properties | | |
| Acid no., mg KOH/g | —* | 0.03 |
| Hydroxyl no., mg KOH/g | 39.4 | 39.3 |
| Water, wt. % | 0.01 | 0.01 |
| Viscosity, 77° F., cps | 1136 | 2384 |
| Appearance | Homogeneous dispersion | |

*Not determined

EXAMPLES 4 and 5

These examples will illustrate the preparation of polymer polyols using a 3,000 m.w. epoxy resin-modified triol (THANOL® F-3050 made by Texaco Chemical Co.) as the dispersing media. The general procedure of Example 1 was used in these experiments. Reaction charges, details of preparation, and properties are as follows:

| Example | 2 | 3 |
|---|---|---|
| Charge | | |
| THANOL ® F-3050, g | 900 | 800 |
| Styrene, g | 40 | 80 |
| Acrylonitrile, g | 60 | 120 |
| VAZO 67, g | 10 | 10 |
| Reaction Details | | |
| Temperature, °C. | 130–134 | 128–132 |
| Monomer addition time, hr. | 0.9 | 1.1 |
| Digestion time, hr. | 0.03 | 0.25 |
| Monomer conversion, % | 92 | 97.3 |
| Properties | | |
| Acid no., mg KOH/g | 0.03 | 0.016 |
| Hydroxyl no., mg KOH/g | 53.5 | 51.6 |
| Water, wt. % | 0.01 | 0.09 |
| Viscosity, 77° F., cps | 1430 | 2584 |
| Appearance | Homogeneous dispersion | |

| -continued | |
|---|---|
| Monomer conversion, % | 93.9 |
| Properties | |
| Hydroxyl no., mg KOH/g | 38.6 |
| Water, wt. % | |
| Viscosity, 77° F., cps | 2810 |
| Appearance | Homogeneous dispersion |

EXAMPLE 7

This example will show the use of the polymer polyols of this invention in the preparation of flexible polyurethane foam. It will further show the improved load bearing properties (as measured with a Chatillon gauge) of these foams as compared to those made from prior art polyols. In these formulations, the tin level was adjusted to make all foams with the same degree of openness.

Formulations and foam properties are shown in the following table:

| Foam No. | A | B | C | D | E | F | G |
|---|---|---|---|---|---|---|---|
| Formulation, pbw | | | | | | | |
| THANOL ® F-3016[a] | 100 | — | — | 50 | 50 | 50 | 50 |
| THANOL F-3050[b] | — | — | 100 | — | — | — | — |
| THANOL F-3550[c] | — | 100 | — | — | — | — | — |
| THANOL F-3050 (10% polymer)[d] | — | — | — | 50 | — | — | — |
| THANOL F-3550 (10% polymer)[e] | — | — | — | — | 50 | — | — |
| THANOL F-3050 (20% polymer)[f] | — | — | — | — | — | 50 | — |
| THANOL F-3550 (20% polymer)[g] | — | — | — | — | — | — | 50 |
| Water | 3.5 | 3.5 | 3.5 | 3.5 | 3.5 | 3.5 | 3.5 |
| L-711 Silicone[h] | 1.0 | 1.0 | 1.0 | 1.0 | 1.0 | 1.0 | 1.0 |
| Niax A-200 catalyst[i] | 0.35 | 0.35 | 0.35 | 0.35 | 0.35 | 0.35 | 0.35 |
| T-10 Catalyst[j] | 0.38 | 0.30 | 0.27 | 0.27 | 0.27 | 0.27 | 0.27 |
| Toluene diisocyanate | 45.2 | 46.1 | 46.8 | 46.8 | 45.4 | 46.4 | 45.4 |
| Isocyanate index | 1.1 | 1.1 | 1.1 | 1.1 | 1.1 | 1.1 | 1.1 |
| Properties | | | | | | | |
| Density, pcf | 1.66 | 1.67 | 1.67 | 1.72 | 1.74 | 1.75 | 1.68 |
| Chatillon gauge[k] reading (25% indentation, lb.) | 4.31 | 4.55 | 4.48 | 4.64 | 4.65 | 4.98 | 4.94 |

[a]3,000 m.w. propylene oxide/ethylene oxide adduct of glycerine made by Texaco Chemical Co.
[b]3,000 m.w. epoxy resin-modified propylene oxide/ethylene oxide adduct of glycerine made by Texaco Chemical Co.
[c]3,500 m.w. epoxy resin-modified propylene oxide/ethylene oxide adduct of glycerine made by Texaco Chemical Co.
[d]From Example 4
[e]From Example 2
[f]From Example 5
[g]From Example 3
[h]A product of Union Carbide Corp.
[i]Tertiary amine catalyst made by Union Carbide Corp.
[j]50% stannous octoate in dioctyl phthalate made by M & T Chemicals
[k]Manual Model LIC compression tester manufactured by John Chatillon

EXAMPLE 6

This example will show the preparation of a polymer polyol using a 45.4 hydroxyl no. sucrose/glycerine initiated, DGEBPA-modified polyol in the dispersing media. This polyol had a propylene oxide/ethylene oxide ratio of 80.8:19.2 and contained 0.5 wt. % combined DGEBPA. The general procedure of Example 1 was used for preparation of this polymer polyol. Reaction charges, details of preparation and properties are shown in the following table:

| Mixed initiator polyol, g | 800 |
|---|---|
| Styrene, g | 80 |
| Acrylonitrile, g | 120 |
| VAZO 67, g | 10 |
| Reaction Details | |
| Temperature, °C. | 128–133 |
| Monomer addition time, hr. | 1.0 |
| Digestion time, hr. | 0.3 |

It may be seen from Example 7 that foams made from the vinyl polymer polyols of this invention (Foams D, E, F, and G) have better load bearing properties (Chatillon gauge readings of 4.64–4.94) than a foam made from a conventional polyol (Foam A, 4.31 reading) or foams made from conventional epoxy resin-modified polyols (Foams B and C, 4.55 and 4.48 readings, respectively). The Chatillon gauge measures the number of pounds it takes to indent a standard piece of foam 25% in height.

EXAMPLE 8

This example will show that polymer polyols of this invention are more effective at raising the hardness of flexible foams than prior art polymer polyols. In these formulations, the tin catalyst level was adjusted to prepare all foams with the same degree of openness.

Formulations and foam properties are shown in the following table.

| Foam No. | H | I | J |
|---|---|---|---|
| THANOL ® F-3050 (20% polymer)[a] | 50 | — | — |
| THANOL F-3550 (20% polymer)[b] | — | 50 | — |
| THANOL F-3016 | 50 | 50 | 50 |
| NIAX ® 34-37[c] | — | — | 50 |
| Water | 3.5 | 3.5 | 3.5 |
| L-711 silicone | 1.0 | 1.0 | 1.0 |
| NIAX A-200 Catalyst | 0.35 | 0.35 | 0.35 |
| T-10 catalyst | 0.27 | 0.27 | 0.27 |
| Toluene diisocyanate | 46.4 | 45.4 | 46.8 |
| Isocyanate index | 1.1 | 1.1 | 1.1 |
| Properties | | | |
| Density, pcf | 1.75 | 1.68 | 1.73 |
| Chatillon gauge reading (25% indentation, lb.) | 4.98 | 4.94 | 4.86 |

[a] From Example 5
[b] From Example 3
[c] A conventional styrene/acrylonitrile copolymer polyol manufactured by Union Carbide Corp. containing approximately 18% polymer, considered comparable to the inventive polymer polyols.

From Example 8, it is discovered that foams made from the vinyl polymer polyols of this invention (Foams H and I) have greater load-bearing strength (Chatillon readings of 4.98 and 4.94, respectively) than a foam made using a conventional polymer polyol (Foam J, with a reading of 4.86).

Many modifications may be made in the vinyl polymer polyols of this invention without departing from the spirit and scope thereof which are defined only in the appended claims. For example, one skilled in the art may find that using a particular combination of vinyl monomers and epoxy resin-modified polyols, proportions thereof and certain reaction conditions give a polymer polyol with especially advantageous properties.

We claim:

1. A vinyl polymer polyol prepared by the process comprising
    polymerizing via a free-radical reaction a monomer component consisting of at least one vinyl monomer in the presence of an epoxy resin-modified polyol.

2. The vinyl polymer polyol of claim 1 in which the monomer component is selected from the group consisting of styrene, acrylonitrile, methyl methacrylate, methyl acrylate, butadiene and mixtures thereof.

3. The vinyl polymer polyol of claim 1 in which the monomer component is a mixture of styrene and acrylonitrile in mole ratios of 9:1 to 1:9.

4. The vinyl polymer polyol of claim 1 in which the polymer loading of the polyol is in the range of about 5 to 50 wt. %.

5. The vinyl polymer polyol of claim 1 in which the epoxy resin-modified polyol is made by reacting a polyol initiator having an active hydrogen functionality of 3 to 8 and one or more alkylene oxides with an epoxy resin in such a manner that the epoxy resin is added internally along the length of the resultant epoxy resin-modified polyol.

6. The vinyl polymer polyol of claim 1 in which a free radical initiator is employed in a concentration of from 0.1 to 5.0% and which is selected from the group consisting of organic peroxides, peroxydicarbonates, peroxyesters, 2,2'-azobis(2,4-dimethylpentanenitrile), 2,2'-azobis (2-methylpropene nitrile), 2,2'-azobis(2-methylbutanenitrile), and 1,1'-azobis(cyanocyclohexane), and mixtures thereof.

7. The vinyl polymer polyol of claim 1 in which the reaction is conducted at a temperature in the range of 75° to 150° C. and at a pressure in the range of atmospheric to about 100 psig.

8. A vinyl polymer polyol prepared by the process comprising
    polymerizing via a free-radical reaction a vinyl monomer component selected from the group consisting of styrene, acrylonitrile, methyl methacrylate, methyl acrylate, butadiene and mixtures thereof, in the presence of an epoxy resin-modified polyol having a 2,000 to 7,000 molecular weight, in which the polymer loading of the polyol is in the range of about 5 to 50 wt. %.

9. The vinyl polymer of claim 8 in which the vinyl monomer component is a mixture of styrene and acrylonitrile in mole ratios of 9:1 and 1:9.

10. The vinyl polymer polyol of claim 8 in which the epoxy resin-modified polyol is made by reacting a polyol initiator having an active hydrogen functionality of 3 to 8 and one or more alkylene oxides with an epoxy resin such that the epoxy resin is added internally along the length of the resultant epoxy resin-modified polyol.

11. The vinyl polymer of claim 8 in which a free-radical initiator is employed in a concentration of from 0.1 to 5.0% and which is selected from the group consisting of organic peroxides, peroxydicarbonates, peroxyesters, 2,2'-azobis(2,4-dimethylpentanenitrile), 2,2'-azobis(2-methylpropanenitrile), 2,2'-azobis(2-methylbutanenitrile), 1,1'-azobis(cyanocylohexane) and mixtures thereof.

12. The vinyl polymer polyol of claim 8 in which the reaction is conducted at a temperature in the range of 75° to 150° C. and at pressure in the range of atmospheric to about 100 psig.

13. A vinyl polymer polyol prepared by the process comprising
    polymerizing via a free-radical reaction
    a. a vinyl monomer component consisting of styrene and acrylonitrile in a molar ratio ranging from 9:1 to 1:9 in the presence of a free-radical initiator, also in the presence of
    b. an epoxy resin-modified polyol made by reacting a polyol initiator having an active hydrogen functionality of 3 to 8 and one or more alkylene oxides with an epoxy resin such that the epoxy resin is added internally along the length of the resultant epoxy resin-modified polyol which has a 2,000 to 7,000 molecular weight,
    at a temperature in the range of 75° to 150° C. and a pressure in the range of atmospheric to about 100 psig, to give a vinyl polymer polyol with a polymer loading in the range of 5 to 50 wt. %.

14. The vinyl polymer polyol of claim 13 in which the free-radical initiator is employed in a concentration of from 0.1 to 5.0% based on the total amount of reactants, and is selected from the group consisting of organic peroxides, peroxydicarbonates, peroxyesters, 2,2'-azobis(2,4-dimethylpentanenitrile), 2,2'-azobis(2-methylpropanenitrile), 2,2'-azobis(2-methylbutanenitrile), 1,1'-azobis(cyanocyclohexane) and mixtures thereof.

* * * * *